United States Patent
Fukuda

(10) Patent No.: US 10,379,791 B2
(45) Date of Patent: Aug. 13, 2019

(54) IMAGE FORMING APPARATUS CAPABLE OF PERFORMING RECOVERY PRINTING

(71) Applicant: CANON KABUSHIKI KAISHA, Tokyo (JP)

(72) Inventor: Shin Fukuda, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/802,851

(22) Filed: Nov. 3, 2017

(65) Prior Publication Data

US 2018/0157446 A1    Jun. 7, 2018

(30) Foreign Application Priority Data

Dec. 5, 2016   (JP) .................................. 2016-235746

(51) Int. Cl.
| | |
|---|---|
| *G06F 3/12* | (2006.01) |
| *B41J 11/00* | (2006.01) |
| *B41J 29/48* | (2006.01) |
| *G06K 15/16* | (2006.01) |
| *B41J 13/00* | (2006.01) |
| *G06K 15/00* | (2006.01) |

(52) U.S. Cl.
CPC ............ *G06F 3/121* (2013.01); *B41J 11/006* (2013.01); *B41J 13/0009* (2013.01); *B41J 13/009* (2013.01); *B41J 29/48* (2013.01); *G06F 3/1219* (2013.01); *G06F 3/1234* (2013.01); *G06F 3/1264* (2013.01); *G06K 15/16* (2013.01); *G06K 15/4085* (2013.01)

(58) Field of Classification Search
USPC ............................... 358/1.1–3.29, 1.11–1.18
See application file for complete search history.

(56) References Cited

U.S. PATENT DOCUMENTS

| | | | |
|---|---|---|---|
| 2008/0079980 A1* | 4/2008 | Matsubara | B41J 13/0009 358/1.14 |
| 2008/0229940 A1* | 9/2008 | Levin | B41J 11/006 101/2 |
| 2009/0097060 A1* | 4/2009 | Okada | G03G 15/6538 358/1.15 |
| 2010/0033743 A1* | 2/2010 | Hirai | H04N 1/00002 358/1.9 |

FOREIGN PATENT DOCUMENTS

JP    2015089628 A    5/2015

* cited by examiner

*Primary Examiner* — Marcellus J Augustin
(74) *Attorney, Agent, or Firm* — Rossi, Kimms & McDowell LLP

(57) ABSTRACT

An image forming apparatus capable of performing recovery printing while avoiding wasteful discarding of printed sheets following a defective sheet. An image is formed on a sheet by an image forming section based on an input job and is inspected. An inserter inserts sheets placed thereon into sheets conveyed from the image forming section. When a defective sheet is detected, the job is interrupted, and the defective sheet and subsequent sheets already printed are discharged to a different destination from a destination of normal sheets. Resuming the interrupted job is instructed by a user, and an image to be printed on the defective sheet is formed on a sheet newly fed from a sheet feeder, and the sheet is discharged to the destination of normal sheets, and sheets placed on the inserter are discharged to the same.

10 Claims, 16 Drawing Sheets

SHEET CONVEYING DIRECTION

SHEET CONVEYING DIRECTION

FIG. 11A

| JOB ID | SHEET NUMBER | SHEET FEED TRAY | PRINT PAGE NUMBER |
|---|---|---|---|
| 0001 | 1 | SHEET FEED TRAY 201 | FIRST SIDE: 1<br>SECOND SIDE: 2 |
| 0001 | 2 | SHEET FEED TRAY 201 | FIRST SIDE: 3<br>SECOND SIDE: 4 |
| 0001 | 3 | SHEET FEED TRAY 201 | FIRST SIDE: 5<br>SECOND SIDE: 6 |
| 0001 | 4 | SHEET FEED TRAY 201 | FIRST SIDE: 7<br>SECOND SIDE: 8 |
| 0001 | 5 | SHEET FEED TRAY 201 | FIRST SIDE: 9<br>SECOND SIDE: 10 |
| 0001 | 6 | SHEET FEED TRAY 201 | FIRST SIDE: 11<br>SECOND SIDE: 12 |
| 0001 | 7 | SHEET FEED TRAY 201 | FIRST SIDE: 13<br>SECOND SIDE: 14 |
| 0001 | 8 | SHEET FEED TRAY 201 | FIRST SIDE: 15<br>SECOND SIDE: 16 |
| 0001 | 9 | SHEET FEED TRAY 201 | FIRST SIDE: 17<br>SECOND SIDE: 18 |
| 0001 | 10 | SHEET FEED TRAY 201 | FIRST SIDE: 19<br>SECOND SIDE: 20 |
| 0001 | 11 | SHEET FEED TRAY 201 | FIRST SIDE: 21<br>SECOND SIDE: 22 |
| ⋮ | ⋮ | ⋮ | ⋮ |

310 SHEET POINTER → (pointing to row with sheet number 9)

FIG. 11B

| JOB ID | SHEET NUMBER | SHEET FEED TRAY | PRINT PAGE NUMBER |
|---|---|---|---|
| 0001 | 1 | SHEET FEED TRAY 201 | FIRST SIDE: 1 SECOND SIDE: 2 |
| 0001 | 2 | SHEET FEED TRAY 201 | FIRST SIDE: 3 SECOND SIDE: 4 |
| 0001 | 3 | INSERTER TRAY 221 | FIRST SIDE: NONE SECOND SIDE: NONE |
| 0001 | 4 | INSERTER TRAY 221 | FIRST SIDE: NONE SECOND SIDE: NONE |
| 0001 | 5 | INSERTER TRAY 221 | FIRST SIDE: NONE SECOND SIDE: NONE |
| 0001 | 6 | INSERTER TRAY 221 | FIRST SIDE: NONE SECOND SIDE: NONE |
| 0001 | 7 | INSERTER TRAY 221 | FIRST SIDE: NONE SECOND SIDE: NONE |
| 0001 | 8 | INSERTER TRAY 221 | FIRST SIDE: NONE SECOND SIDE: NONE |
| 0001 | 9 | SHEET FEED TRAY 201 | FIRST SIDE: 17 SECOND SIDE: 18 |
| 0001 | 10 | SHEET FEED TRAY 201 | FIRST SIDE: 19 SECOND SIDE: 20 |
| 0001 | 11 | SHEET FEED TRAY 201 | FIRST SIDE: 21 SECOND SIDE: 22 |
| ⋮ | ⋮ | ⋮ | ⋮ |

310 SHEET POINTER → (points to sheet number 2)

1101 (bracket around sheet numbers 3–8)

IMAGE FORMING APPARATUS CAPABLE OF PERFORMING RECOVERY PRINTING

BACKGROUND OF THE INVENTION

Field of the Invention

The present invention relates to an image forming apparatus that is capable of performing recovery printing without discarding normal sheets.

Description of the Related Art

In recent years, there has been known a printing system (image forming system) that makes it possible to inspect a printed sheet using an inspection device while conveying the sheet. When inspecting a printed sheet, an image on the printed sheet which is being conveyed is read by the inspection device, and the read image is analyzed to thereby determine whether or not the printed sheet is a normal sheet. The inspection device is capable of detecting missing of a bar code or ruled lines, image missing, defective printing, page missing, color misregistration, and so forth. Normally, in a case where a printed sheet is determined as a defective sheet, the defective sheet is discharged to a discharge destination which is different from a discharge destination of normal sheets. This prevents the defective sheet from being mixed in the normal sheets, and enables an operator to discard the defective sheet. Further, sheets following the defective sheet, which have already been fed at the time point and are being conveyed (hereinafter referred to as the "subsequent sheets"), are also discharged to the same discharge destination as that of the defective sheet. When all the subsequent sheets have been discharged, the system resumes printing from an image to be printed on the defective sheet. This makes it possible to perform recovery printing without messing up the page order.

However, the subsequent sheets are printed again by recovery printing, and hence even if the subsequent sheets have been normally printed in the first printing, the subsequent sheets are discarded. To eliminate this inconvenience, Japanese Laid-Open Patent Publication (Kokai) No. 2015-089628 proposes an image forming system in which a storage section for storing printed sheets is provided in a conveying passage upstream of the inspection device, and a defective sheet is discharged into a different discharge destination from a discharge destination of normal sheets. The image forming system disclosed in Japanese Laid-Open Patent Publication (Kokai) No. 2015-089628 prints, by recovery printing, an image to be printed on the defective sheet again on a new sheet, and discharges the sheet to the same discharge destination as that of normal sheets through a bypass passage bypassing the storage section from the upstream side to the downstream side thereof. After that, the image forming system discharges the printed sheets stacked on the storage section to the same discharge destination as that of normal sheets. This realizes recovery printing in which the page order is maintained.

However, according to the image forming system disclosed Japanese Laid-Open Patent Publication (Kokai) No. 2015-089628, it is necessary to provide a saving section, such as the storage section for temporarily storing printed sheets, and the bypass passage for bypassing the saving section. This increases the size and costs of the image forming system.

SUMMARY OF THE INVENTION

The present invention provides an image forming apparatus that is capable of performing recovery printing while avoiding wasteful discarding of printed sheets following a defective sheet.

In a first aspect of the present invention, there is provided an image forming apparatus comprising a sheet feeder configured to feed a sheet, an image forming unit configured to form an image on the sheet fed from the sheet feeder based on an input job, an inspection unit configured to inspect the image on the sheet conveyed from the image forming unit, an insertion unit, provided upstream of the inspection unit in a sheet conveying direction, configured to insert a sheet into sheets conveyed from the image forming unit, and a control unit configured to interrupt the job in a case where a defective sheet is detected by the inspection unit, and change a discharge destination of the defective sheet and subsequent sheets which follow the defective sheet and are already printed, and an instruction unit configured to give an instruction for resuming the interrupted job, wherein the control unit is configured to, based on the instruction for resuming the interrupted job from the instruction unit, control the image forming unit to form an image which is to be formed on the defective sheet on a sheet newly fed from the sheet feeder, and control the insertion unit to insert the subsequent sheets on the newly fed sheet.

In a second aspect of the present invention, there is provided an image forming apparatus that includes a sheet feeder configured to feed a sheet, and an image forming unit configured to form an image on the sheet fed from the sheet feeder based on an input job, and is capable of having an insertion unit connected thereto, for inserting sheets placed thereon into sheets conveyed from an image forming unit, the image forming apparatus comprising an inspection unit configured to inspect the image on the sheet conveyed from the image forming unit, a control unit configured to interrupt the job in a case where a defective sheet is detected by the inspection unit, and change a discharge destination of the defective sheet and subsequent sheets which follow the defective sheet and are already printed, and an instruction unit configured to give an instruction for resuming the interrupted job, wherein the control unit is configured to, based on the instruction for resuming the interrupted job from the instruction unit, control the image forming unit to form an image which is to be formed on the defective sheet on a sheet newly fed from the sheet feeder, and control the insertion unit to insert the subsequent sheets on the newly fed sheet.

According to the present invention, it is possible to perform recovery printing while avoiding wasteful discarding of printed sheets following a defective sheet.

Further features of the present invention will become apparent from the following description of exemplary embodiments (with reference to the attached drawings).

BRIEF DESCRIPTION OF THE DRAWINGS

FIGS. 11A and 11B are conceptual diagrams showing an example of changes in the sheet feeding management table.

DESCRIPTION OF THE EMBODIMENTS

The present invention will now be described in detail below with reference to the accompanying drawings showing embodiments thereof.

Figure 1:
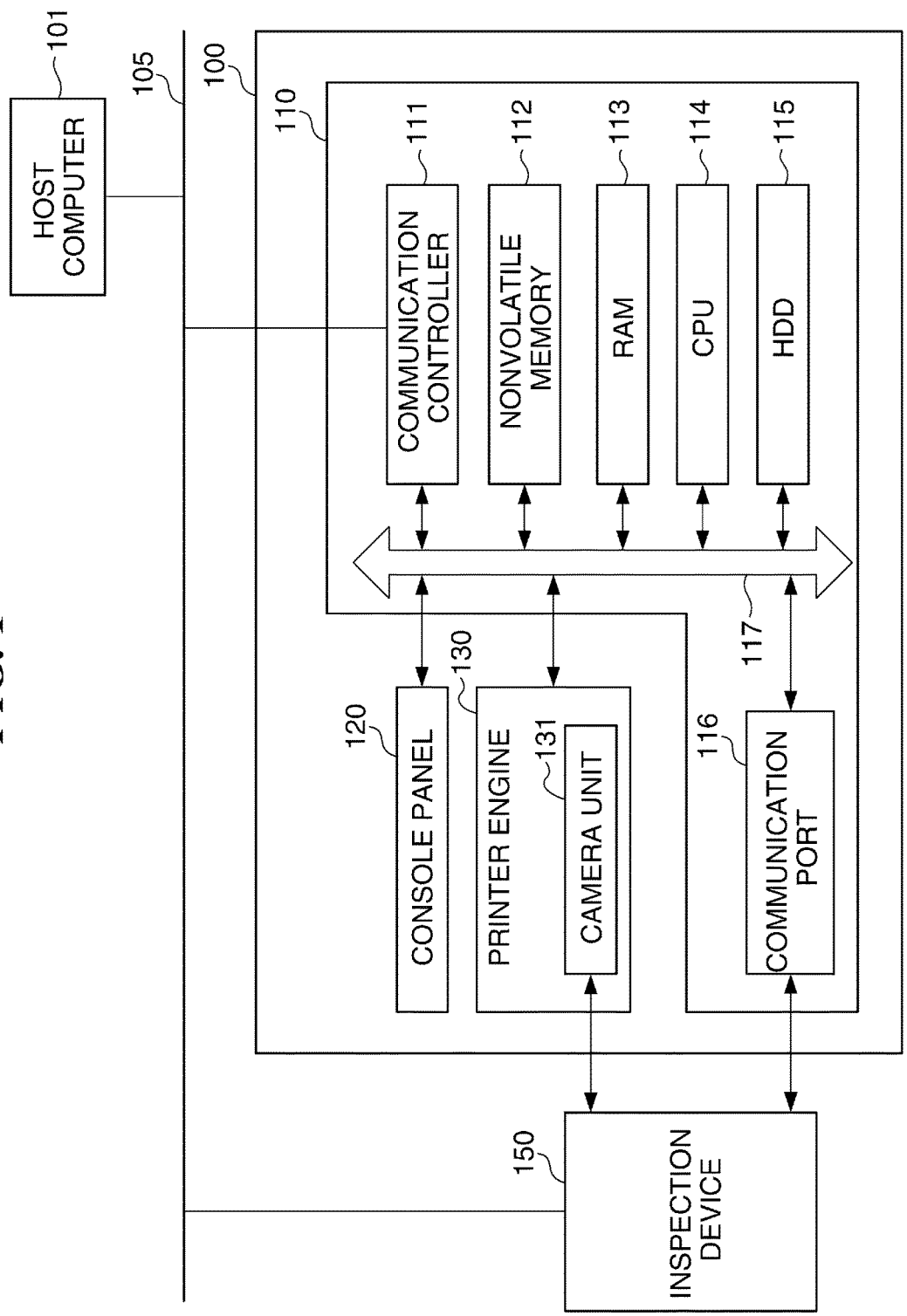
FIG. 1 is a schematic block diagram of a printing system.

FIG. 1 is a schematic block diagram of a printing system (image forming system) equipped with a printing apparatus as an image forming apparatus according to a first embodiment of the present invention. This printing system includes the printing apparatus, denoted by reference numeral 100, a host computer 101, and an inspection device 150. The printing apparatus 100, the host computer 101, and the inspection device 150 are interconnected by a communication line 105. At least one of the host computer, the printing apparatus, and the inspection device may be provided in plurality. Note that even if the printing system is a system in which blocks are connected via a network, such as a LAN or a WAN, to perform processing operations, the present invention can be applied, unless otherwise specified.

The host computer 101 is capable of acquiring information input by a user using an input device, not shown, generating a print job, and transmitting and inputting the generated print job to the printing apparatus 100. A controller board 110 performs various data processing operations, and controls the operation of the printing apparatus 100. Although in the present example, the controller board 110 is incorporated in the printing apparatus 100, the controller board 110 can be provided independently of the printing apparatus 100, and be connected to the printing apparatus 100. A console panel 120 is an operation panel that receives various operations and instructions from a user using a touch panel, and corresponds to an instruction unit of the present invention.

A printer engine 130 physically prints image data generated by the controller board 110 on print paper (sheet). The printer engine 130 will be described in detail with reference to FIG. 2. A camera unit 131 is provided in the printer engine 130, and reads a printed sheet using a camera. The inspection device 150 is connected to the printing apparatus 100. The inspection device 150 inspects a sheet image read by the camera unit 131, and detects whether or not the printed sheet is defective. The position where the camera unit 131 is disposed is a position where a sheet is inspected by the inspection device 150. The inspection device 150 is connected to the communication line 105 which is an external communication network, and is capable of receiving the settings of inspection items, a comparison source image, and so on, e.g. from the host computer 101.

Next, the construction of the controller board 110 will be described. A communication controller 111 controls communication with the communication line 105. A nonvolatile memory 112 is a nonvolatile storage device, and stores a control program used at the start of the apparatus, and so forth. Various control programs are loaded into a RAM 113. A CPU 114 executes the control programs loaded into the RAM 113, and performs centralized control over image signals and various devices. The RAM 113 also functions as a main memory and a work memory for the CPU 114. An HDD 115 temporarily stores large-volume data, such as image data and various setting data, or holds such large-volume data for a long term. The control programs and an operating system are stored not only in the nonvolatile memory 112, but also in the HDD 115. Note that an NVRAM may be further provided, and printing apparatus mode setting information acquired from the console panel 120 may be stored in the NVRAM. A communication port 116 (acquisition unit) receives (acquires) an electric signal indicative of a result of inspection from the inspection device 150. These modules are interconnected via a system bus 117. That is, the system bus 117 connects the controller board 110 and the devices in the printing apparatus 100 with each other.

Figure 2:
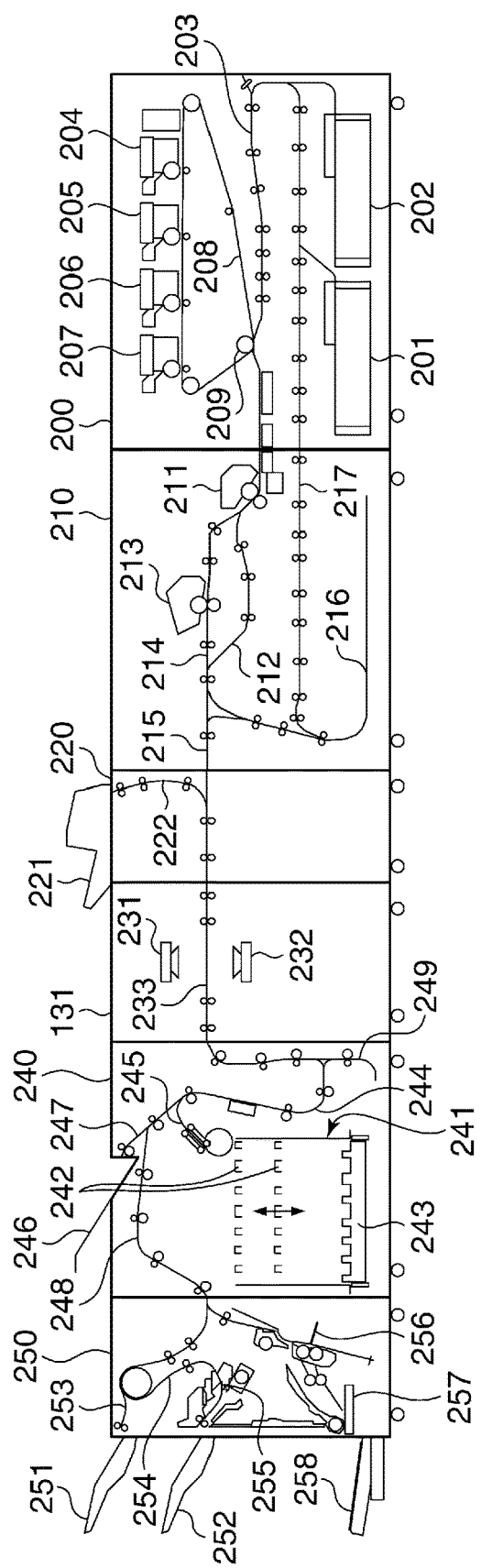
FIG. 2 is a cross-sectional view showing the arrangement of a printer engine.

FIG. 2 is a cross-sectional view showing the arrangement of the printer engine 130. The printer engine 130 includes an image forming unit 200, an image fixing unit 210, an inserter 220, a stacker 240, and a finisher 250, and these components are sequentially connected in a sheet conveying direction from an upstream side. The image forming unit 200 and the image fixing unit 210 form an image forming section.

The image forming unit 200 prints an image on a sheet (paper). Sheet feed trays 201 and 202 can accommodate various types of sheets. From the sheet feed trays 201 and 202, only one sheet on the top of a stored sheet bundle is separated, and is conveyed to a sheet conveying path 203. Developing stations 204, 205, 206, and 207 form toner images using color toners of Y, M, C, and K, respectively, so as to form a color image. The toner images formed by the developing stations are primarily transferred onto an intermediate transfer belt 208, which is rotated in a clockwise direction as viewed in FIG. 2, and the toner image is transferred onto a sheet conveyed from the sheet conveying path 203 at a secondary transfer position 209. The sheet having the toner image transferred thereon is conveyed to the image fixing unit 210.

In the image fixing unit 210, a first fixing device 211 fixes the toner image onto the sheet. The first fixing device 211 includes a pressure roller and a heating roller, and when the sheet passes between the rollers, toner is subjected to melting and pressure fixing by the rollers, whereby the toner image is fixed onto the sheet. The sheet having passed through the first fixing device 211 is conveyed to a sheet conveying path 215 through a sheet conveying path 212. In a case where, depending on a type of the sheet, processing for melting and pressure fixing is further required to fix the toner image, the sheet is conveyed, after passing through the first fixing device 211, to a second fixing device 213 via an upper conveying path, for additionally subjecting the sheet to melting and pressure fixing, and then the sheet is conveyed to the sheet conveying path 215 through a sheet conveying path 214. In a case where an image formation mode is a double-sided printing mode, the sheet is conveyed into a sheet inversion path 216, and after having the front (upper) and reverse (lower) sides thereof inverted in the sheet inversion path 216, the sheet is conveyed into a double-sided conveying path 217. Then, the sheet is conveyed to the secondary transfer position 209, wherein an image is transferred onto the second side of the sheet.

The inserter 220 is an insertion unit for inserting an insertion sheet. The inserter 220 includes an inserter tray 221 as a tray for insertion, from which a sheet is fed through a sheet conveying path 222 to be added to the flow in the conveying path. This makes it possible to insert a sheet between a series of printed sheets conveyed from the image fixing unit 210, at a desired position, and convey the sheet to the downstream unit. The sheet having passed through the inserter 220 is conveyed to the camera unit 131.

The camera unit 131 has cameras 231 and 232 arranged therein in a manner opposed to each other. The camera 231 reads an upper surface of the sheet, and the camera 232 reads a lower surface of the sheet. The camera unit 131 starts to read images printed on the sheet using the cameras 231 and 232 at the time when the sheet conveyed in a sheet conveying path 233 reaches a predetermined position, and sends the read images of the sheet to the inspection device 150.

The stacker 240 is a large-capacity stacker that is capable of stacking a large volume of sheets therein. The stacker 240 includes a stack tray 241 as a tray for stacking sheets, and the stack tray 241 is comprised of a lift table 242 and an eject table 243. The sheet having passed through the camera unit 131 is conveyed into the stacker 240 through a sheet conveying path 244. The sheet is stacked on the lift table 242 of the stack tray 241 via a sheet conveying path 245 from the sheet conveying path 244. When the lift table 242 has no sheet stacked thereon, it is at a position higher than the eject table 243 with respect to the positions of the respective top ends. As stacking of a sheet bundle proceeds, the lift table 242 is moved downward by an amount corresponding to the height of the stacked sheet bundle, and the position of the lift table 242 is controlled such that the top of the stacked sheet bundle is always at a fixed height. When stacking of the sheet bundle is completed, or the lift table 242 is fully stacked with sheets, the lift table 242 is moved downward to a position of the eject table 243. The lift table 242 and the eject table 243 each have bars for supporting a sheet bundle which are arranged such that bars of one table and bars of the other table are located in an alternating manner. Therefore, when the lift table 242 is moved downward to reach a position lower than the eject table 243, the sheet bundle is transferred onto the eject table 243.

Further, the stacker 240 includes an escape tray 246 as a discharge tray. The escape tray 246 is a discharge destination of a sheet which is determined to be defective as a result of inspection by the inspection device 150 (hereinafter referred to as the defective sheet). In a case where a sheet is delivered to the escape tray 246, the sheet is conveyed from the sheet conveying path 244 through a sheet conveying path 247 to the escape tray 246. Note that in a case where the sheet is conveyed to the finisher 250 which is arranged on a downstream side of the stacker 240, the sheet is conveyed through a sheet conveying path 248. An inverting portion 249 inverts the sheet. The inverting portion 249 is used for stacking a sheet on the stack tray 241. That is, the stacker 240 has a mechanical configuration in which when stacking a sheet on the stack tray 241, the sheet is flipped and then stacked on the lift table 242, so that the sheet is inverted upside down. For this reason, in a case where it is necessary to make the orientation of a sheet identical between when the sheet is fed and when the sheet is delivered, the sheet is inverted once by the inverting portion 249 before being stacked on the stack tray 241. In a case where the sheet is conveyed to the escape tray 246 or is conveyed to the finisher 250, the sheet is discharged without being flipped for stacking, and hence the inversion operation by the inverting portion 249 is not performed.

The finisher 250 is a post-processing apparatus that performs finishing processing on a sheet conveyed thereto using a function designated by a user. More specifically, the finisher 250 has finishing functions, such as stapling (stapling at one position/two positions), punching (two holes/three holes), and saddle-stitching bookbinding. The finisher 250 includes two discharge trays 251 and 252, and delivers a sheet to the discharge tray 251 through a sheet conveying path 253. However, a sheet cannot be subjected to finishing processing, such as stapling, in the sheet conveying path 253. To perform finishing processing, such as stapling, on a sheet, the sheet is conveyed into a processing section 255 through a sheet conveying path 254, the finishing function designated by the user is performed on the sheet conveyed into the processing section 255, and then, the sheet is delivered to the discharge tray 252. The discharge trays 251 and 252 can be moved up and down, respectively. The finisher 250 can also operate to cause the discharge tray 251 to move downward, and stack a sheet subjected to finishing processing by the processing section 255 thereon. In a case where saddle-stitching bookbinding is designated, the finisher 250 performs stapling on the center of the sheets by a saddle-stitching processing section 256, and then, folds the sheets into two, and delivers the sheets to a saddle-stitching bookbinding tray 258 through a sheet conveying path 257. The saddle-stitching bookbinding tray 258 includes a belt conveyor, and a saddle-stitched book bundle stacked on the saddle-stitching bookbinding tray 258 is conveyed out to the left, as viewed in FIG. 2.

Figure 3:
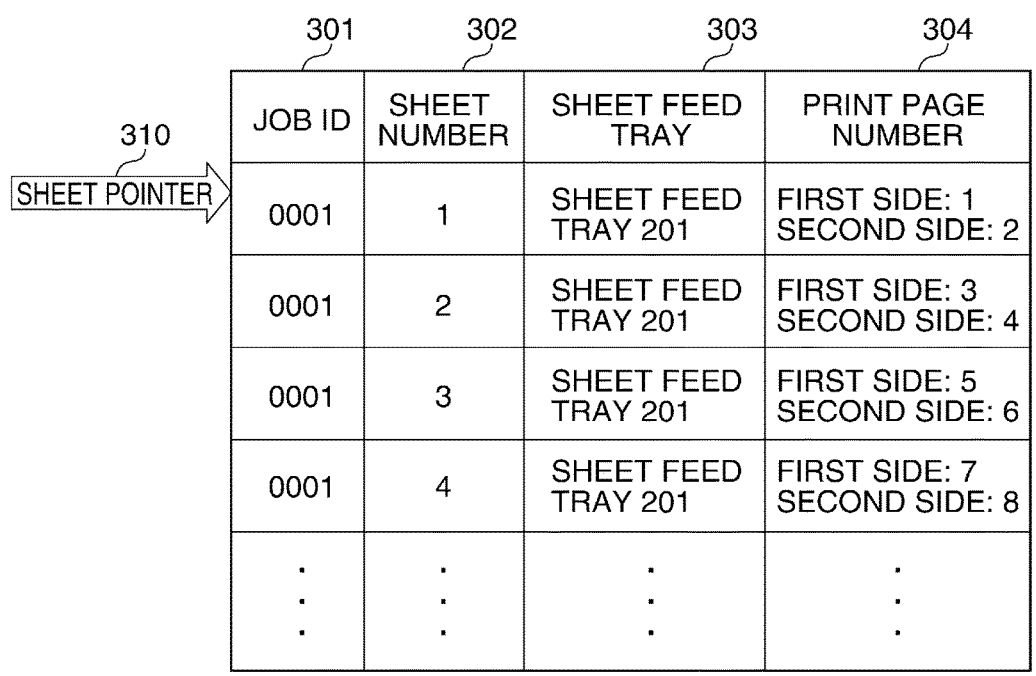
FIG. 3 is a conceptual diagram of a sheet feeding management table.

FIG. 3 is a conceptual diagram of a sheet feeding management table which is referred to when the printing apparatus 100 feeds a sheet. When the printing apparatus 100 starts processing of a print job, the CPU 114 generates the sheet feeding management table by analyzing print settings included in the print job. In the sheet feeding management table, each box of a column 301 indicates a job ID. The job ID is information assigned uniquely to each job received by the printing apparatus 100. Each box of a column 302 indicates a sheet number set by sequentially numbering sheets used in each job. The sheet feeding management table adds a row, on a sheet number-by-sheet number basis. Each box of a column 303 indicates a sheet feed tray which is a sheet feeding source from which the corresponding sheet is supplied. One sheet feed tray is determined for each sheet based on sheet designation information included in a print job, such as a sheet size and a sheet type, sheet information set to the sheet feed tray, and so forth. Each box of a column 304 indicates a page number of an image to be printed on each of sides (a first side and a second side) of the corresponding sheet. In a case where a sheet is to be subjected to double-sided printing, page numbers are assigned to the first side and the second side of the sheet, respectively. In a case where a sheet is to be subjected to single-sided printing, the print page of the second side of the sheet is set to "none". Further, in a case where a sheet is one not to be subjected to printing, such as a sheet fed by the inserter, the print pages of the first and second sides of the sheet are both set to "none". When processing of a print job is started, the CPU 114 first generates the sheet feeding management table, and thereafter instructs feeding of each sheet by referring to the sheet feeding management table. A sheet pointer 310 points to the current reference position in the sheet feeding management table, and upon completion of feeding of each sheet, the CPU 114 moves the sheet pointer 310 to a row associated with the next sheet.

Figure 4A:
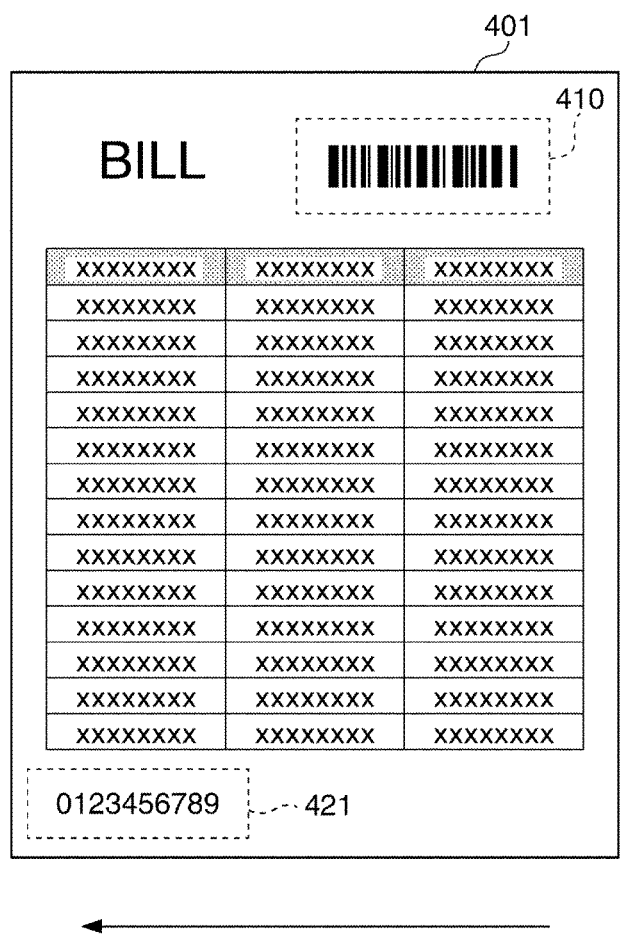
FIG. 4A is a diagram showing an example of a sheet image on an upper surface of a sheet.
Figure 4B:
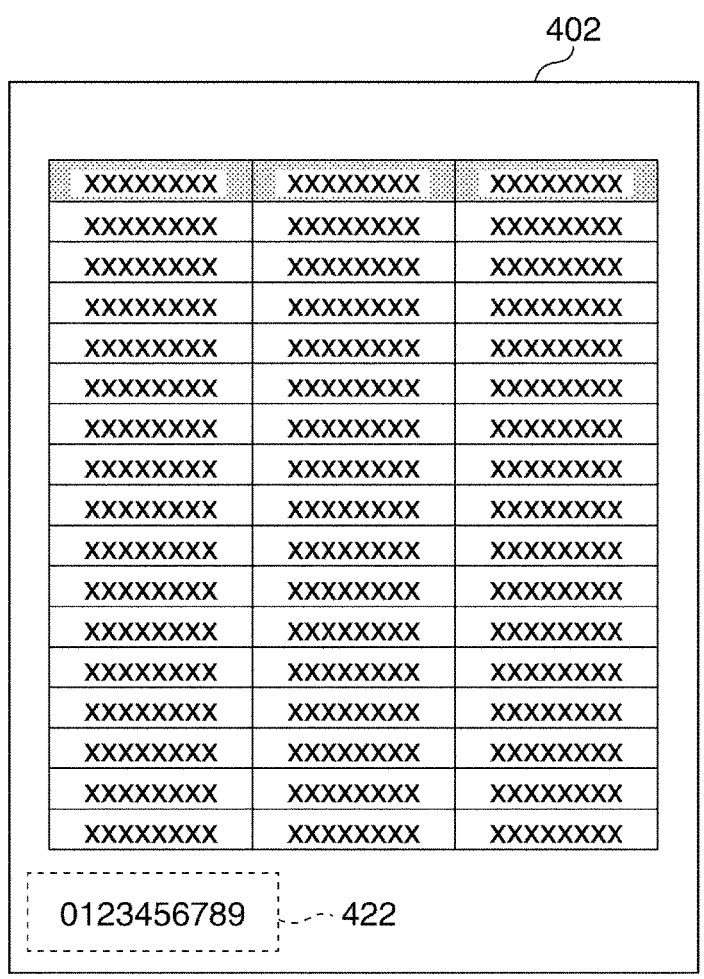
FIG. 4B is a diagram showing an example of a sheet image on a lower surface of the sheet.

FIGS. 4A and 4B show an example of sheet images on upper and lower surfaces of a sheet sent from the inspection device 150, respectively. The inspection device 150 inspects an image on the sheet sent thereto according to the inspection items set in advance. Although the inspection items include various items, here, bar code readability inspection and front-reverse collation inspection will be described by way of example.

A sheet image 401 is an image on the upper surface of a sheet, read by the camera 231. A sheet image 402 is an image on the lower surface of the sheet, read by the camera 232. As an area to be inspected, the sheet image 401 has inspection areas 410 and 421, and the sheet image 402 has an inspection area 422. The inspection device 150 first determines whether or not a bar code existing in the area 410 can be read. If the bar code can be read, it is determined that the bar code has been normally printed, whereas if not, it is determined that the print of the bar code is defective. Next, the inspection device 150 extracts values included in the inspection areas 421 and 422 as character data items, respectively, by OCR (Optical Character Recognition). Here, it is assumed that original data of the print job is formed such that in a case where the printing is normally performed, the same numerical value is printed on the front and reverse sides (the upper surface and the lower surface) of the sheet. In a case where the numerical values extracted from the inspection areas 421 and 422 are the same, normal printing is detected in which intended printing has been performed on the front and reverse sides of the sheet, whereas if the numerical values are different from each other, defective printing is detected. The inspection device 150 performs these inspections, and if defective printing is detected in any of the areas, the corresponding sheet is determined as a "defective sheet", whereas if defective printing is not detected in any of the areas, the corresponding sheet is determined as a "normal sheet".

The inspection device 150 may be configured to be capable of performing other various inspections, such as sheet duplication inspection, sheet missing inspection, color misregistration inspection, color tone inspection, and full image comparison inspection between a read image and original data. The details of inspection applied to the present invention are not particularly limited. Note that the settings of the inspection areas and the inspection contents for the inspection device 150 are input e.g. from the host computer 101 via the communication line 105. In a case where the full image comparison inspection is performed, the inspection device 150 receives a comparison source image e.g. from the host computer 101. Further, the inspection device 150 may be configured differently such that it includes an operation section and settings of the inspection areas and the inspection contents are made by a user from the operation section.

Figure 5:
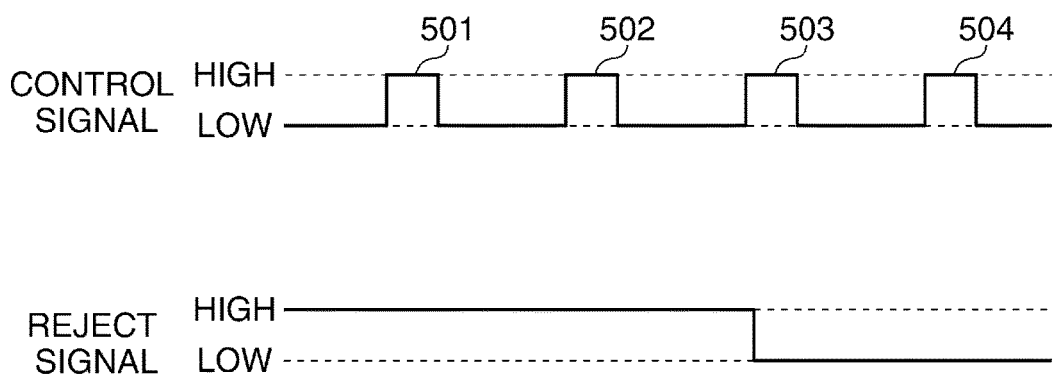
FIG. 5 is a timing diagram showing a control signal and a reject signal.

FIG. 5 is a timing diagram showing a control signal and a reject signal. The control signal and the reject signal are both received by the controller board 110 from the inspection device 150 via the communication port 116. The control signal indicates that a sheet has passed the camera unit 131, and a sheet image read from the sheet has been transferred to the inspection device 150. The control signal is a pulse signal in which the signal value thereof is normally low, and when the inspection device 150 receives a sheet image transferred thereto, the signal value thereof becomes high over a fixed time period. The illustrated control signal indicates that four sheet images corresponding to pulses 501 to 504 have been transferred to the inspection device 150.

On the other hand, the reject signal is indicative of whether or not a defective sheet is detected. If the reject signal shifts from high to low when the control signal is high, this indicates the corresponding sheet image is detected to be defective. The illustrated reject signal indicates that the sheet image corresponding to the pulse 503 is detected to be defective. Note that in the present embodiment, when a defective sheet is detected, the inspection device 150 interrupts inspection with respect to the subsequent sheets, and the reject signal remains low until printing is resumed or canceled.

Next, the operation of the printing apparatus 100 performed when a defective sheet is detected by the inspection device 150 will be described with reference to FIGS. 6 to 11A and 11B.

Figure 6:
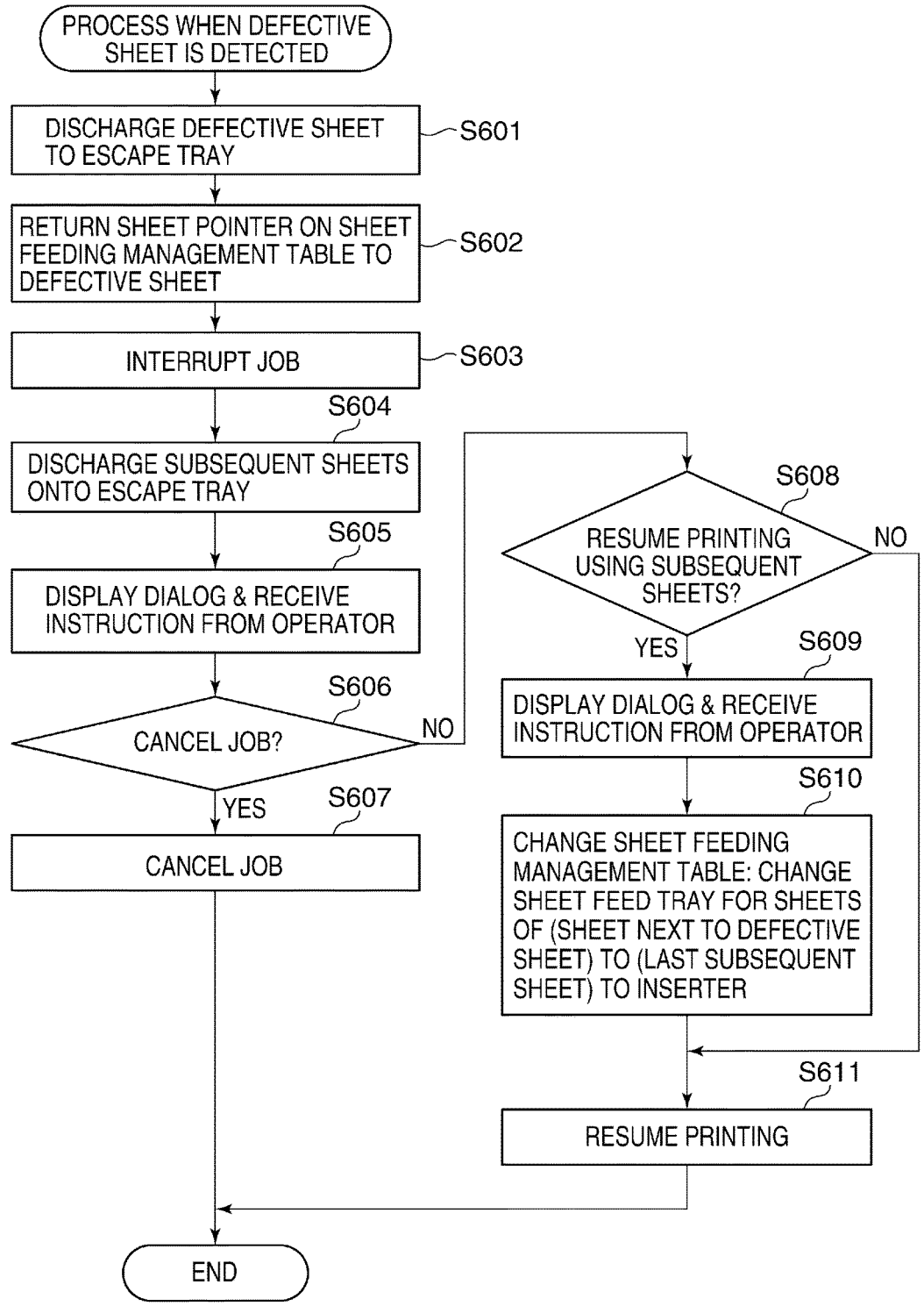
FIG. 6 is a flowchart of a process performed when a defective sheet is detected.

FIG. 6 is a flowchart of a process performed when a defective sheet is detected. The CPU 114 realizes this process by executing a program read out from the nonvolatile memory 112 storing the same. This process is started when the printing apparatus 100 receives a notification to the effect that a defective sheet is detected, from the inspection device 150 via the communication port 116. In this process, the CPU 114 functions as a control unit of the present invention.

First, in a step S601, the CPU 114 instructs the stacker 240 to discharge the defective sheet onto the escape tray 246. Upon receipt of this instruction, the stacker 240 conveys the defective sheet into the conveying path 247, and discharges the defective sheet onto the escape tray 246. In a step S602, the CPU 114 returns the sheet pointer 310 to a position corresponding to the defective sheet in the sheet feeding management table (see FIG. 3). In a step S603, the CPU 114 interrupts the print job being executed for printing. By interrupting the print job, a new sheet is prevented from being fed from the sheet feeder (sheet feed tray 201 or 202).

Sheets following the defective sheet, which have already been fed from the sheet feeder of the image forming unit 200, are referred to as the "subsequent sheets". The subsequent sheets are being conveyed within the printer engine 130 when the defective sheet is detected. In the present embodiment, before completion of job interruption, images are formed on the subsequent sheets based on the job, and hence after completion of the job interruption, the subsequent sheets all become printed sheets. In a step S604, the CPU 114 instructs the stacker 240 to sequentially discharge all of the subsequent sheets onto the escape tray 246. Upon receipt of this instruction, the subsequent sheets, which have been printed, are discharged, following the defective sheet, onto the escape tray 246. It is to be understood that the aforementioned completion of job interruption requires completion of image formation on unprinted ones of the subsequent sheets. In a step S605, the CPU 114 displays a dialog, shown in FIG. 7, on the console panel 120, and receives an instruction from the operator (user).

Figure 7:
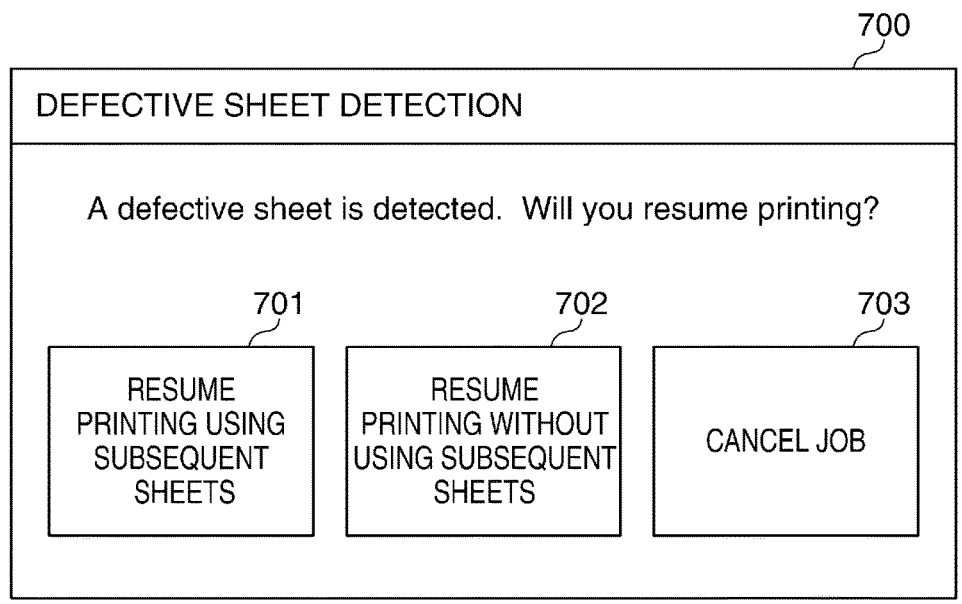
FIG. 7 is a diagram showing an example of a dialog screen displayed when a defective sheet is detected.

FIG. 7 is a diagram showing an example of the dialog screen, denoted by reference numeral 700, displayed when a defective sheet is detected. The operator can select a handling method for a print job in which a defective sheet is detected, from the dialog screen 700. A button 701 is used for selecting a method of print resumption using the subsequent sheets, i.e. using the subsequent sheets which have been printed, as deliverables. When the button 701 is pressed, printing is resumed from an image to be printed on the defective sheet, and the subsequent sheets, which have been printed, are fed from the inserter 220 after the sheets are moved from the escape tray 246 to the inserter 220 by the operator.

A button 702 is used for selecting a method of print resumption without using the subsequent sheets. When the button 702 is pressed, printing is resumed from an image to be printed on the defective sheet, and images are printed on the subsequent sheets based on the print job again. A button 703 is used for selecting a method of job cancellation. When the button 703 is pressed, the print job is canceled.

In a step S606, the CPU 114 determines whether or not the method of job cancellation is selected by the operator in the step S605. If the method of job cancellation is selected, in a step S607, the CPU 114 cancels printing of the job in which the defective sheet is detected, and terminates the series of processing operations in FIG. 6. On the other hand, if the method of job cancellation is not selected, in a step S608, the CPU 114 determines whether or not the method of print resumption using the subsequent sheets is selected by the operator. Then, if the method of print resumption using the subsequent sheets is selected, in a step S609, the CPU 114 displays a dialog, shown in FIG. 8, on the console panel 120, and receives an instruction from the operator.

Figure 8:
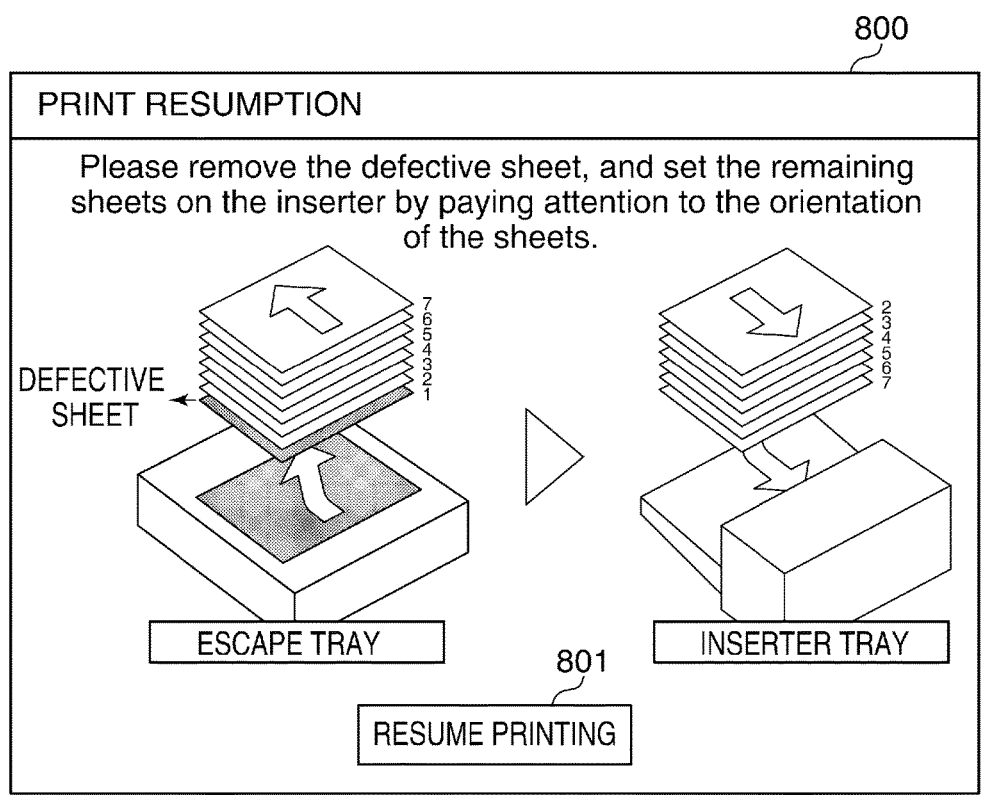
FIG. 8 is a diagram showing an example of a dialog screen displayed when printing is resumed.

FIG. 8 is a diagram showing an example of the dialog screen, denoted by reference numeral 800, displayed when printing is to be resumed using the subsequent sheets. The dialog screen 800 displays an image and a message for prompting the operator to remove the defective sheet (sheet stacked at the bottom) from the sheet bundle discharged on the escape tray 246, and placing the subsequent sheets which are the rest of the sheet bundle on the inserter tray 221.

The message notifies the operator that the subsequent sheets, which have been printed, are to be placed on the inserter tray 221. Further, the display of such a bitmap image as shown in FIG. 8 gives a guide to a method of correctly placing the subsequent sheets in accordance with the orientation of sheets to be fed from the inserter 220. In which orientation the subsequent sheets should be placed on the inserter tray 221 and whether or not the subsequent sheets should be turned upside down are different depending on a sheet feeding mechanism of the inserter. In view of this, in the illustrated example in FIG. 8, the dialog screen 800 prompts the operator to place the subsequent sheets on the inserter tray 221 in a manner turned upside down in accordance with the sheet feeding mechanism of the inserter 220 of the present embodiment. This notifies the operator of how to place the subsequent sheets having been printed.

A button 801 is used for instructing resumption of printing after the operator places the subsequent sheets on the inserter tray 221 (sheet transfer operation). Normally, the operator presses the button 801 after properly placing the subsequent sheets stacked on the escape tray 246 onto the inserter tray 221 according to the guidance. When the button 801 is pressed, the process proceeds to a step S610.

In the step S610, the CPU 114 updates the contents of the sheet feeding management table (see FIG. 3). More specifically, the CPU 114 changes the sheet feed tray and the print page to "inserter tray 221" and "first side: none, second side: none" with respect to each of the sheets from "the next sheet following the defective sheet" to "the last sheet of the subsequent sheets". With this change, when printing is resumed, the sheet feeding operation is performed according to the updated sheet feeding management table, and the subsequent sheets are fed from the inserter tray 221. The number of sheets to be fed from the inserter tray 221 is equal to the number of the subsequent sheets.

Next, in a step S611, the CPU 114 resumes printing, and terminates the series of processing operations in FIG. 6. Further, if it is determined in the step S608 that the method of print resumption without using the subsequent sheets is selected, printing is resumed without executing the steps S609 and S610 (step S611). Therefore, the image to be printed on the defective sheet and subsequent images are printed again (including fixation of images) on sheets newly fed from the sheet feeder of the image forming unit 200. In this case, the defective sheet and the subsequent sheets discharged to the escape tray 246 are not used, but discarded.

Next, an example of the process of operations for print resumption using the subsequent sheets in a case where a defective sheet is detected will be described with reference to FIGS. 9A to 11C. FIGS. 9A to 10C are schematic diagrams showing operations performed in the printer engine 130 when a defective sheet is detected, for feeding and conveying sheets, in a chronological order, in which illustration of the finisher 250 is omitted. It is assumed that the number of sheets to be printed in the job is nine or more, the second sheet is detected as a detective sheet, and the use of the subsequent sheets as deliverables is selected. The description is given also with reference to FIG. 6.

Figure 9A:
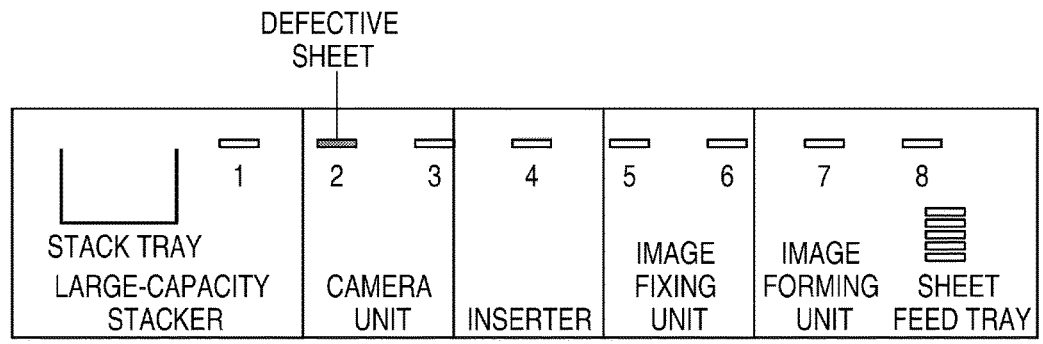
FIGS. 9A to 9C are schematic diagrams showing operations performed when a defective sheet is detected, for feeding and conveying sheets, in a chronological order.
Figure 9B:
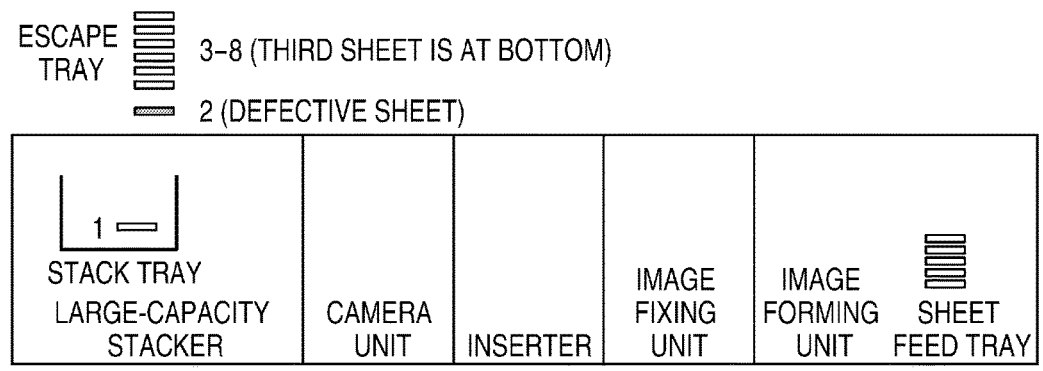
Figure 9C:
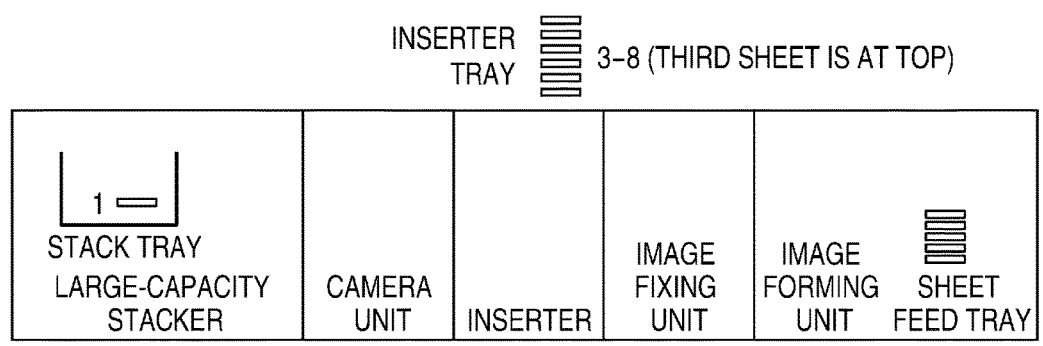
Figure 10A:
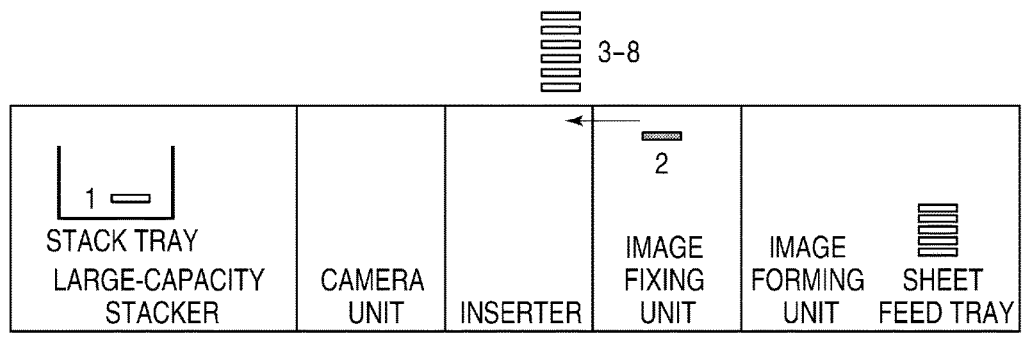
FIGS. 10A to 10C are a continuation of FIGS. 9A to 9C.
Figure 10B:
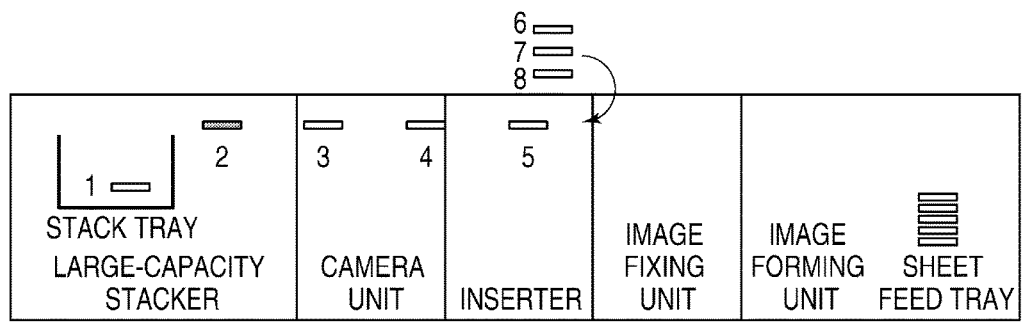
Figure 10C:
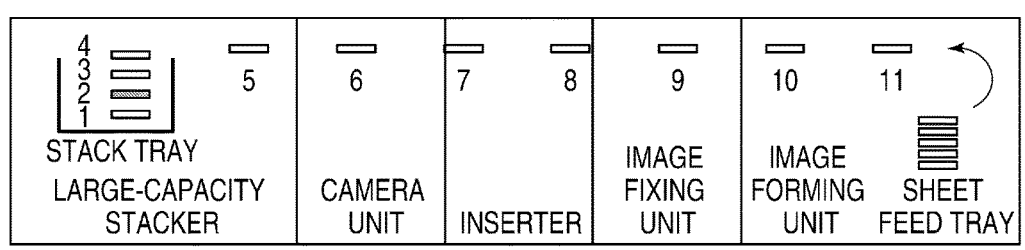

First, when a defective sheet is detected by the inspection device 150, sheet conveyance within the printer engine 130 is in a state shown in FIG. 9A. It is assumed that sheets up to a sheet 8 have already been fed when the second sheet (sheet 2) is detected as the detective sheet during printing of the print job. In this case, a sheet 1 as a normal sheet is discharged onto the stack tray 241 as designated by the job. Next, the step S601 is executed to thereby cause the defective sheet (sheet 2) to be discharged onto the escape tray 246, and then, the step S604 is executed to thereby cause the subsequent sheets (sheets 3 to 8) to be also discharged onto the escape tray 246 (see FIG. 9B). The sheets 2, 3, . . . , 8 are stacked on the escape tray 246 in the mentioned order from the bottom.

Next, the step S605 is executed to thereby cause the dialog screen 700 (see FIG. 7) to be displayed on the console panel 120. When the operator presses the button 701 on this display, the step S609 is executed to cause the dialog screen 800 (see FIG. 8) to be displayed on the console panel 120. When the operator properly places the subsequent sheets on the inserter tray 221 according to the guidance, the state of the printer engine 130 is shifted to the state shown in FIG. 9C. That is, the operator places the sheets 3 to 8 on the inserter tray 221 such that the sheet 3 is on the top.

Next, the step S610 is executed to thereby update the sheet feeding management table. This update operation will be described hereinafter with reference to FIGS. 11A and 11B. Then, when the step S611 is executed to cause printing to be resumed, a sheet is newly fed from the sheet feeder of the image forming unit 200, and the image to be printed on the sheet 2 is printed again on the new sheet (including fixation of the image) according to the updated sheet feeding management table (see FIG. 10A). Next, after the sheet 2 is conveyed and passes through the inserter 220, the sheets 3 to 8 are fed from the inserter tray 221 according to the updated sheet feeding management table, and are sequentially conveyed to the stacker 240, following the sheet 2 (see FIG. 10B). Next, a sheet 9 and subsequent sheets are fed from the sheet feeder of the image forming unit 200, printed according to the job, and then conveyed to the stacker 240, following the sheet 8 (see FIG. 10C). As a result, the properly printed sheets are discharged and stacked on the stacker 240 in the proper order, whereby it is possible to obtain the proper deliverables according to the job.

FIGS. 11A and 11B are conceptual diagrams showing an example of changes in the sheet feeding management table according to the operations shown in FIGS. 9A to 10C. FIG. 11A shows the sheet feeding management table set when the printer engine 130 is in the state shown in FIG. 9A. Since the sheets up to the eighth sheet have been fed in the print job, the sheet pointer 310 points to the sheet 9. FIG. 11B shows the sheet feeding management table set when the printer engine 130 is in the state shown in FIG. 9C. By executing the step S602, the sheet pointer 310 has returned to the position of the sheet 2 as the defective sheet. Further, by executing the step S610, the sheet feed tray and the print page of the sheets 3 to 8 are changed to "inserter tray 221" and "first side: none, second side: none", respectively (part indicated by a frame 1101). This causes, when printing is resumed, the sheet 2 to be subjected to printing again, and the sheets 3 to 8 to be fed from the inserter tray 221.

According to the above-described printing system, in recovery printing performed when a defective sheet is detected, the subsequent sheets can be fed from the inserter. As a consequence, in the printing system that makes it possible to perform image inspection with respect to a sheet being conveyed, it is possible to provide the recovery print function that prevents sheets from being wastefully discarded without arranging a new storage section in the apparatus, which improves the convenience of the printing system.

According to the present embodiment, a job is interrupted when a defective sheet is detected, and the detective sheet and the sheets following the defective sheet, which have been printed, are discharged onto the escape tray 246 which is a discharge destination different from the discharge destination of normal sheets. Then, the job is resumed on condition that resumption of the interrupted job is instructed. For example, after the operator properly places the subsequent sheets, which have been printed, on the inserter tray 221, and then instructs resumption of printing, the job is resumed, and an image to be printed on the defective sheet is printed on a sheet newly fed from the sheet feeder of the image forming unit 200. Then, the newly printed sheet is discharged to the discharge destination of normal sheets (stacker 240). Further, the subsequent sheets stacked on the inserter tray 221 are discharged to the stacker 240 without being printed. Therefore, the subsequent sheets, which have been printed, are discharged to the stacker 240 following the sheet on which the image associated with the defective sheet has been printed. Particularly, since the insertion unit for inserting the subsequent sheets is the inserter 220 connected on a downstream side of the image forming section, it is possible to use the (existing) component which is generally and conventionally arranged in the printing system. Therefore, it is possible to prevent the printed sheets following the defective sheet from being wastefully discarded without providing a dedicated sheet escape section.

Further, when resuming the interrupted job, a message to the effect that the subsequent sheets, which have been printed, are to be placed on the inserter tray 221, and how to place the subsequent sheets are notified (see FIG. 8), and hence it is possible to prompt the user to place the subsequent sheets on the inserter tray 221, and cause the user to place the subsequent sheets in the proper orientation and order. Note that, from this point of view, the form of the notification is not limited to the display shown in FIG. 8, but may be a notification using a voice.

Further, before resuming the interrupted job, whether or not to use the subsequent sheets, which have been printed, as deliverables, is instructed based on an instruction input by the user from the console panel 120, and hence the user can determine whether or not to use the subsequent sheets.

Further, the discharge destination to which a defective sheet is discharged and the discharge destination to which the subsequent sheets, which have been printed, are discharged when a job is interrupted are the common escape tray 246, and hence a simple and easy configuration is enough for coping with the discharge operation.

Note that the discharge destination of the defective sheet and the subsequent sheets is only required to be different from that of normal sheets, and the defective sheet and the subsequent sheets may be discharged to a discharge destination other than the escape tray 246. Further, in a case where an effect obtained by using the same discharge destination for the defective sheet and the subsequent sheets is not required, the defective sheet and the subsequent sheets may be discharged to different discharge destinations.

In the first embodiment, after a defective sheet is detected, the inspection device 150 interrupts image inspection with respect to the subsequent sheets. Therefore, the operator does not know whether the subsequent sheets are normal sheets or include a defective sheet. However, if the subsequent sheets include a defective sheet, even when printing is resumed using the subsequent sheets, a new defective sheet is soon detected, so that printing is interrupted again. In this case, it is more effective to discard all of the subsequent sheets, and print images again on new sheets by resuming printing. Further, in a case where a defective sheet is frequently detected, it is considered that the printing apparatus itself suffers from some problem. In this case, it is a top priority for the operator to cancel the job once and eliminate the problem occurring in the printing apparatus rather than resume printing.

To cope with this, in a second embodiment of the present invention, the inspection device 150 continues image inspection also with respect to the subsequent sheets, and shows the inspection results to the operator to thereby enable the operator to select proper handling of the print job in which the defective sheet is detected. In the present embodiment, a description will be given mainly of different portions from the first embodiment, and the same component elements as those of the first embodiment are denoted by the same reference numerals. The hardware configuration of the printing system in the present embodiment is the same as that described in the first embodiment (see FIGS. 1 and 2). The present embodiment will be described with reference to FIGS. 12 and 13 in place of FIGS. 5 and 6 in the first embodiment, and further with reference to FIG. 14.

Figure 12:
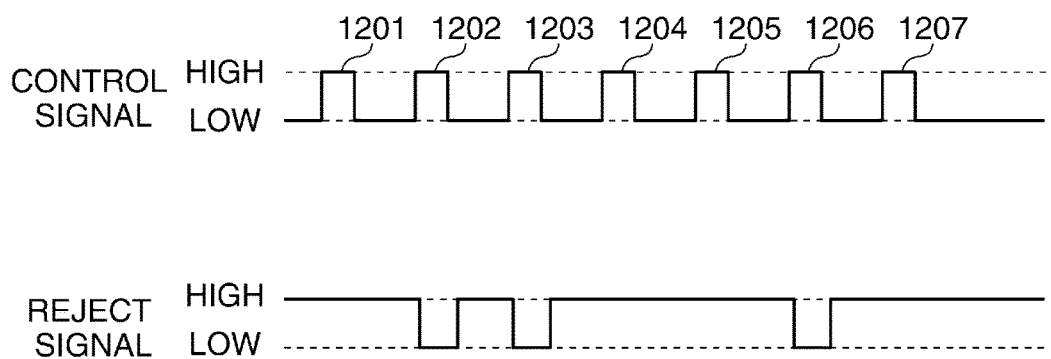
FIG. 12 is a timing diagram showing the control signal and the reject signal.

FIG. 12 is a timing diagram showing the control signal and the reject signal. The present embodiment differs from the first embodiment (see FIG. 5) in that after the reject signal shifts from high to low, the reject signal returns to high after the lapse of a fixed time period. With this, it is possible to notify the printing apparatus 100 of whether or not each sheet is determined as a defective sheet also with respect to the subsequent sheets. The illustrate example in FIG. 12 shows that eight sheet images corresponding to pulse signals 1201 to 1207 have been transferred to the inspection device 150, and defective printing is detected with respect to the sheet images corresponding to the pulse signals 1202, 1203, and 1206 out of the eight sheet images.

Figure 13:
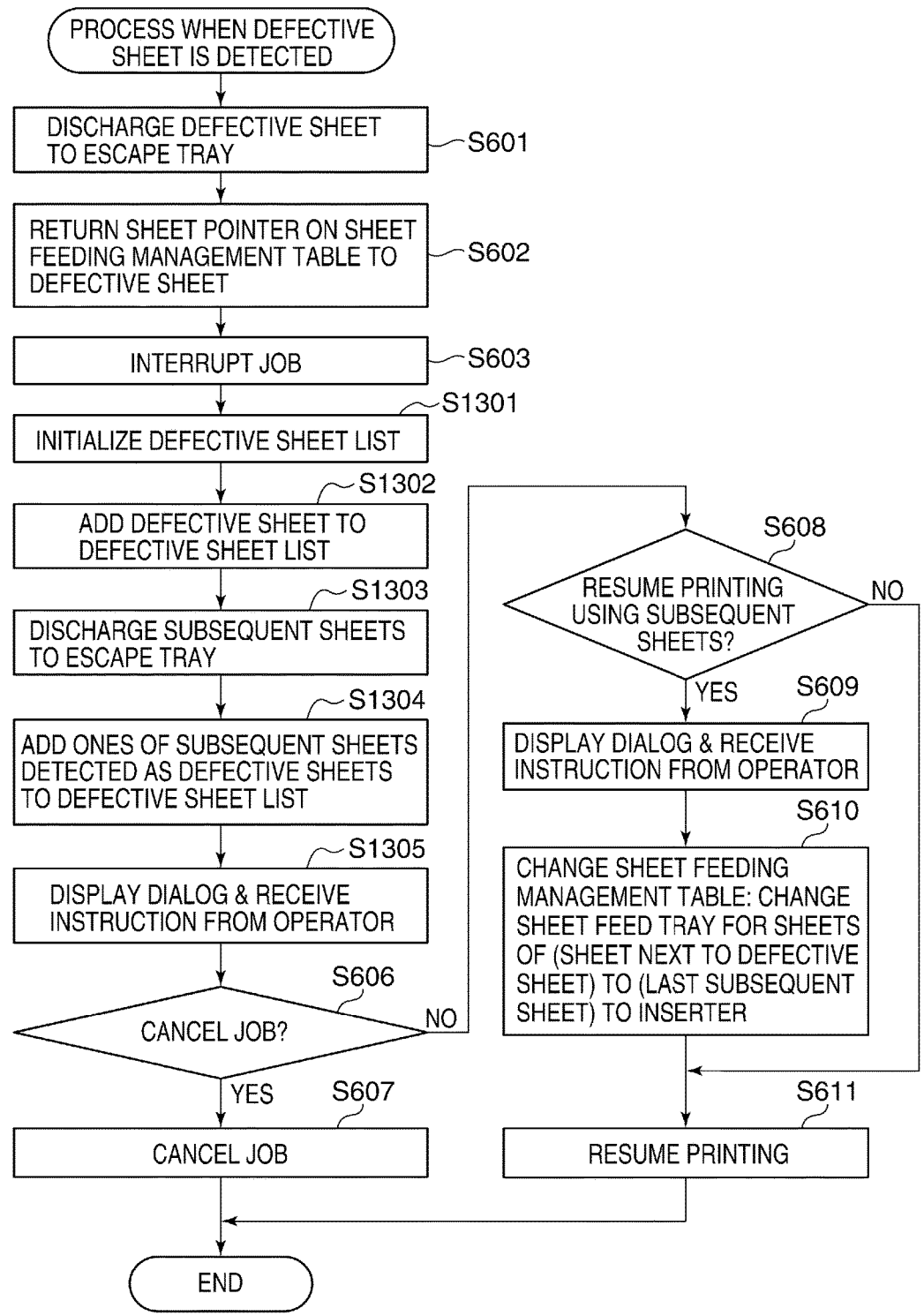
FIG. 13 is a flowchart of a process performed when a defective sheet is detected.

FIG. 13 is a flowchart of a process performed when a defective sheet is detected in the present embodiment. Similar to the process in FIG. 6, the CPU 114 realizes and executes this process when the same conditions of the start of the process are satisfied. The same processing operations in FIG. 13 as those in FIG. 6 are denoted by the same step numbers.

After execution of the steps S601 to S603, in a step S1301, the CPU 114 initializes (empties) a defective sheet list (not shown). Here, the defective sheet list refers to a list recording information of detected defective sheets. More specifically, the name of a job of a detected defective sheet and the number of a page in the job, which has been printed on the defective sheet, are recorded. In a step S1302, the CPU 114 adds the information associated with the defective sheet discharged onto the escape tray 246 in the step S601 to the defective sheet list. In a step S1303, the CPU 114 controls the stacker 240 to discharge the subsequent sheets onto the escape tray 246 after an unprinted one, if any, of the subsequent sheets is printed. In a step S1304, the CPU 114 adds any sheet(s) of the subsequent sheets, each detected as a defective sheet, to the defective sheet list. In a step S1305, the CPU 114 displays a dialog shown in FIG. 14 on the console panel 120, and receives an instruction from the operator.

Figure 14:
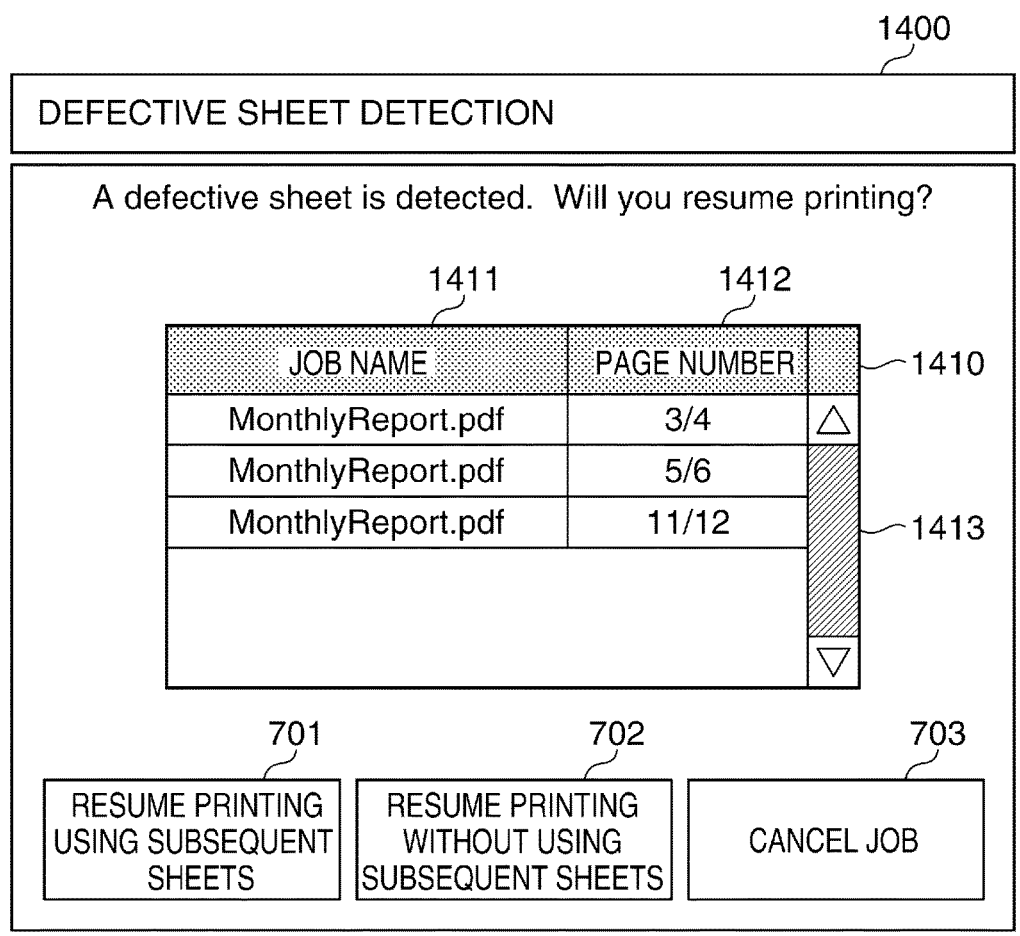
FIG. 14 is a diagram showing an example of a dialog screen displayed when a defective sheet is detected from subsequent sheets.

FIG. 14 is a diagram showing an example of the dialog screen, denoted by reference numeral 1400, which is displayed when any defective sheet is detected from the subsequent sheets. The dialog screen 1400 differs from the dialog screen 700 (see FIG. 7) in that the contents of the defective sheet list (list table 1410 indicative of the defective sheet list) are added. The operator can select a handling method for a print job in which a defective sheet is detected, on the dialog screen 1400. The list table 1410 shows associated information in columns 1411 and 1412 with respect to each defective sheet. Each box of the column 1411 indicates a job name. Each box of the column 1412 indicates respective page numbers of images printed on the defective sheet (including ones of the subsequent sheets each detected as a defective sheet). If the number of defective sheets to be displayed is larger than the number which can be displayed on the list table 1410 at a time, it is possible to refer to all the detected defective sheets by operating a scroll bar 413. As described above, when instructing resumption of printing, the operator can determine whether or not to use the subsequent sheets, which have been printed, as deliverables, by referring to the defective sheet list, which improves the convenience of the printing system.

According to the present embodiment, it is possible to obtain the same advantageous effects as provided by the first embodiment with respect to prevention of wasteful discarding of sheets following a defective sheet, which have been printed, without providing a dedicated sheet escape section. Further, defective printing is inspected also with respect to the subsequent sheets, which have been printed, and the inspection result is notified, and hence the user can determine whether or not to use the subsequent sheets, which have been printed, based on the inspection result.

Note that in the present embodiment, the contents displayed as a result of defective sheet detection of the subsequent sheets are not limited to the job name and the page number, but for example, details of a defect in the print and a preview image of the defective sheet may be further displayed, which further improves the convenience. Alternatively, these information items may be printed on a sheet, and the sheet may be delivered as an error sheet.

Although in the above-described embodiments, the various dialogs displayed to the operator are displayed on the console panel 120, this is not limitative, but these dialogs may be displayed on a display device connected to the inspection device 150, or the like.

Although the image forming apparatus of the present invention includes at least the image forming unit 200 and the image fixing unit 210, the configuration including the inserter 220, or further including the inspection device 150 may be referred to as the image forming apparatus or the image forming system. Further, an inspection device having the function of the camera unit 131 may be connected to a downstream side of the inserter 220. The stacker 240 and the finisher 250 are not necessarily required to be included in the image forming apparatus.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-235746 filed Dec. 5, 2016, which is hereby incorporated by reference herein in its entirety.

What is claimed is:

1. An image forming apparatus comprising:
a sheet feeder configured to feed a sheet;
an image forming unit configured to form an image on the sheet fed from the sheet feeder based on an input job;
an inspection unit configured to inspect the image on the sheet conveyed from the image forming unit, and detect a defective sheet based on the inspection of the image;
an insertion unit, provided upstream of the inspection unit in a sheet conveying direction, configured to feed one or more sheets placed on an inserter tray of the insertion unit by an operator, and insert the one or more sheets into sheets conveyed from the image forming unit;
a control unit configured to interrupt the job in a case where a defective sheet is detected by the inspection unit, and change a discharge destination of the defective sheet and subsequent sheets which follow the defective sheet and are already printed; and an instruction unit configured to give an instruction for resuming the interrupted job, wherein the control unit is configured to, based on the instruction for resuming the interrupted job from the instruction unit, control the image forming unit to form an image which is to be formed on the defective sheet on a sheet newly fed from the sheet feeder, and control the insertion unit to insert the subsequent sheets, which are placed on the inserter tray by the operator and fed from the inserter tray, on the newly fed sheet.

2. The image forming apparatus according to claim 1, wherein before resuming the interrupted job, the instruction unit notifies that the subsequent sheets already printed are to be placed on the insertion unit.

3. The image forming apparatus according to claim 2, wherein the instruction unit notifies how to place the subsequent sheets already printed on the insertion unit.

4. The image forming apparatus according to claim 1, wherein before resuming the interrupted job, the instruction unit instructs whether or not to use the subsequent sheets already printed, as deliverables, based on an instruction from the operator, and wherein in a case where using the subsequent sheets already printed as deliverables is instructed, the control unit causes the image which is to be printed on the defective sheet to be formed on the sheet newly fed from the sheet feeder, thereafter causing the sheet to be discharged to a discharge destination of normal sheets, and causes the subsequent sheets placed on the insertion unit to be discharged to the discharge destination of normal sheets, whereas in a case where not using the subsequent sheets already printed as deliverables is instructed, the control unit causes the image which is to be printed on the defective sheet to be formed on the sheet newly fed from the sheet feeder, thereafter causing the sheet to be discharged to the discharge destination of normal sheets, and causes images which are to be printed on the subsequent sheets to be formed on sheets newly fed from the sheet feeder, thereafter causing the sheets to be discharged to the discharge destination of normal sheets.

5. The image forming apparatus according to claim 1, wherein in a case where the defective sheet is detected, the inspection unit inspects an image on each of the subsequent sheets already printed, and wherein before resuming the interrupted job, the instruction unit notifies results of inspection performed on the subsequent sheets already printed.

6. The image forming apparatus according to claim 1, wherein the control unit causes images to be formed, based on the job, on respective sheets following the subsequent sheets already printed, thereafter causing the sheets to be discharged to a discharge destination of normal sheets.

7. The image forming apparatus according to claim 1, wherein the insertion unit is an inserter connected to a downstream side of the image forming unit.

8. The image forming apparatus according to claim 1, wherein a discharge destination to which the defective sheet is discharged and a discharge destination to which the subsequent sheets already printed are discharged are a common discharge destination.

9. The image forming apparatus according to claim 1, wherein the inspection unit is connected to a downstream side of the insertion unit.

10. An image forming apparatus that includes a sheet feeder configured to feed a sheet, and an image forming unit configured to form an image on the sheet fed from the sheet feeder based on an input job, and is capable of having an insertion unit connected thereto, for feeding one or more sheets placed on an inserter tray of the insertion unit by an operator, and inserting the one or more sheets placed thereon into sheets conveyed from the image forming unit, the image forming apparatus comprising:

an inspection unit configured to inspect the image on the sheet conveyed from the image forming unit, and detect a defective sheet based on the inspection of the image;

a control unit configured to interrupt the job in a case where a defective sheet is detected by the inspection unit, and change a discharge destination of the defective sheet and subsequent sheets which follow the defective sheet and are already printed; and an instruction unit configured to give an instruction for resuming the interrupted job, wherein the control unit is configured to, based on the instruction for resuming the interrupted job from the instruction unit, control the image forming unit to form an image which is to be formed on the defective sheet on a sheet newly fed from the sheet feeder, and control the insertion unit to insert the subsequent sheets which are placed on the inserter tray by the operator and fed from the inserter tray, on the newly fed sheet.

* * * * *